(12) United States Patent
Kato

(10) Patent No.: US 6,785,567 B2
(45) Date of Patent: Aug. 31, 2004

(54) RADIO DEVICE HOLDER INCLUDING DEVICE LOCKING MEMBER AND TRAY HAVING TRAY LOCKING MEMBER

(75) Inventor: Shoji Kato, Musashimurayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 131 days.

(21) Appl. No.: 10/279,862

(22) Filed: Oct. 25, 2002

(65) Prior Publication Data

US 2003/0083115 A1 May 1, 2003

(30) Foreign Application Priority Data

Oct. 26, 2001 (JP) ........................................ 2001-329192

(51) Int. Cl.[7] ................................................ H04B 1/38
(52) U.S. Cl. ................. 455/575.9; 455/573; 455/569.1; 379/433.11
(58) Field of Search .............................. 455/573, 575.1, 455/575.9, 575.4, 575.6, 403, 550.1, 569.1, 569.2; 379/433.05, 433.06, 433.11, 433.12, 433.13, 449, 426, 428.01

(56) References Cited

U.S. PATENT DOCUMENTS

| | | | | |
|---|---|---|---|---|
| 4,903,325 A | * | 2/1990 | Yoshitake et al. | ........ 455/575.9 |
| 5,063,611 A | * | 11/1991 | Kitabayashi | ................ 455/348 |
| 5,457,745 A | * | 10/1995 | Wang | .......................... 379/454 |
| 5,697,071 A | * | 12/1997 | Fan | ........................... 455/575.9 |
| 5,825,874 A | * | 10/1998 | Humphreys et al. | ......... 379/446 |
| 5,836,563 A | * | 11/1998 | Hsin-Yung | ................ 248/316.4 |
| 5,947,359 A | * | 9/1999 | Yoshie | ......................... 224/570 |
| 6,032,027 A | * | 2/2000 | Loza et al. | ............... 455/575.9 |
| 6,229,893 B1 | * | 5/2001 | Chen | ........................... 379/454 |
| 6,263,080 B1 | * | 7/2001 | Klammer et al. | ............ 379/446 |
| 6,269,258 B1 | * | 7/2001 | Peiker | ...................... 455/569.2 |
| 6,360,083 B1 | * | 3/2002 | Fan | ........................... 455/90.1 |

* cited by examiner

*Primary Examiner*—Tilahun Gesesse
(74) *Attorney, Agent, or Firm*—Finnegan, Henderson, Farabow, Garrett & Dunner, L.L.P.

(57) ABSTRACT

A radio device holder includes a holder main unit; a tray having a first side holding section and a second side holding section for holding a portable telephone; a device locking mechanism including a device locking member for engaging with and disengaging from a look recess section of a portable telephone; a stopper rib for restricting the device locking member to an immovable state when the tray is situated in an installation position; a spring for impelling the tray constantly in the direction from the installation position towards a halt/detachment position; a tray locking mechanism including a tray locking member for engaging with the tray when situated in the installation position to fix the position of the tray, and releasing the engagement between the tray locking member and the tray; and an opening edge section for causing a tray moving from the installation position towards the halt/detachment position to stop at the halt/detachment position.

10 Claims, 20 Drawing Sheets

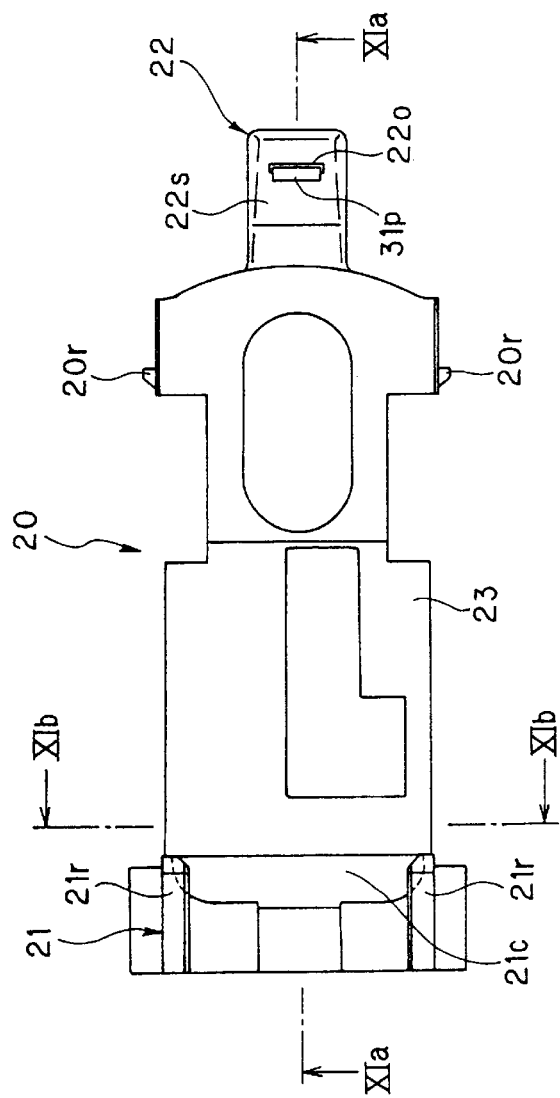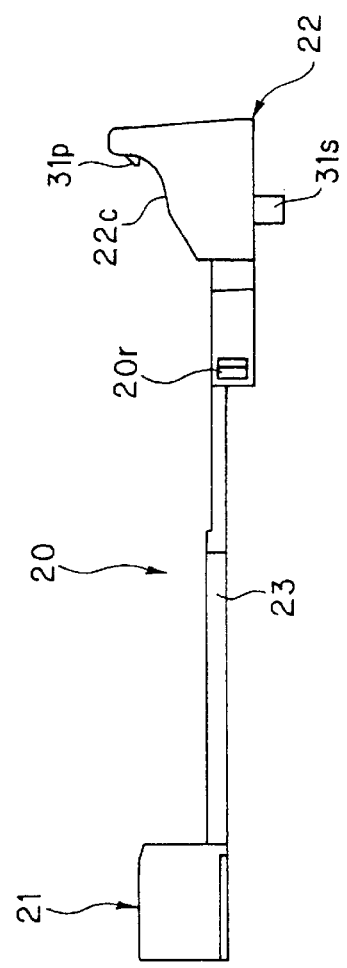
FIG.10A
FIG.10B

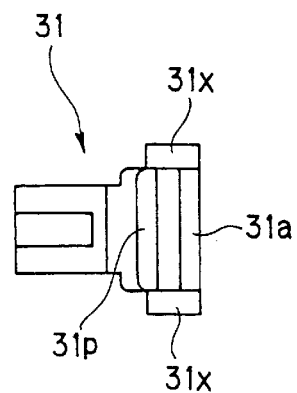
FIG.12B
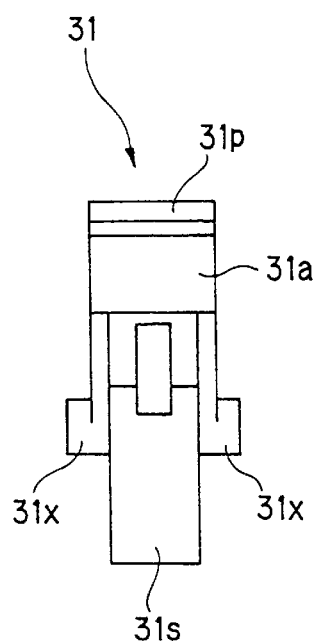
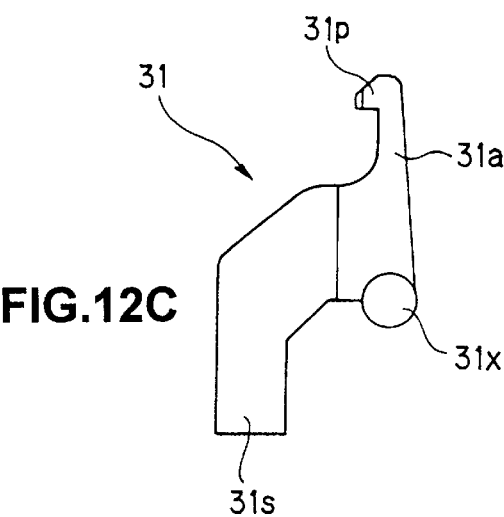
FIG.12C
FIG.12A
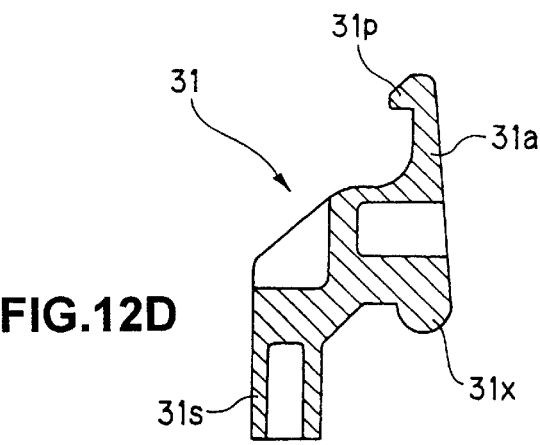
FIG.12D

RADIO DEVICE HOLDER INCLUDING DEVICE LOCKING MEMBER AND TRAY HAVING TRAY LOCKING MEMBER

CROSS-REFERENCE TO RELATED APPLICATIONS

This application is based upon and claims the benefit of priority from the prior Japanese Patent Application No. 2001-329192 filed on Oct. 26, 2001; the entire contents of which are incorporated herein by reference.

BACKGROUND OF THE INVENTION

1. Field of the Invention

The present invention relates to a radio device holder for holding a radio device, such as a portable telephone, or the like, and more particularly, to a radio device holder for holding a radio device in a state where the connector on the device side and the connector on the holder side are mutually interconnected.

2. Description of the Related Art

For example, desirably, an on-vehicle holder for using a portable telephone (radio device) inside a vehicle (radio device holder) permits easy attachment and detachment of the portable telephone with respect to the on-vehicle holder, whilst holding the portable telephone reliably in such a manner that it does not fall off due to vibrations of the vehicle, or the like.

FIG. 19 and FIG. 20 show a conventional on-vehicle holder A for holding a portable telephone T, wherein a device-side connector Tc for transmitting control signals, and the like, is provided in the lower portion of the case of the aforementioned portable telephone T, and locking recess sections Tr are formed on the left and right-hand sides of the case side sections of the aforementioned portable telephone T.

The on-vehicle holder A, on the other hand, comprises a pocket section Aa for accommodating the lower portion of the case of the aforementioned portable telephone T, and provided inside this pocket section Aa are a holder-side connector Ac for interconnecting with the device-side connector Tc of the portable telephone T, and a pusher Ap provided via a spring As.

Moreover, the on-vehicle holder A has left and right-hand side guard sections Ag which face with the case side portions of the portable telephone T, and lock levers Ar for fixing the portable telephone T in position are provided respectively on these guard sections Ag.

In order to install the portable telephone T in the on-vehicle holder A, the operator pushes the portable telephone T by hand in the direction of the arrow I, in other words, in the direction of insertion of the device-side connector Tc into the holder-side connector Ac, and whilst pressing the pusher Ap with the portable telephone T against the force of the spring As, the device connector Tc is interconnected with the holder-side connector Ac.

Here, when the portable telephone T has been inserted to a position where the device-side connector Tc is fully interconnected with the holder-side connector Ac, the portable telephone T is fixed in position in the on-vehicle holder A by means of the lock levers Ar engaging with the locking recess sections Tr.

In this way, by mutually interconnecting the holder-side connector Ac and the device-side connector Tc, the on-vehicle holder A and the portable telephone T are electrically connected, in addition to which, by engaging the lock levers Ar with the locking recess sections Tr, the portable telephone T is fixed mechanically in the on-vehicle holder A.

On the other hand, when removing the installed portable telephone T from the on-vehicle holder A, the operating buttons Ab provided on the lock levers Ar should be pressed, thereby releasing the engagement of the lock levers Ar with the locking recess sections Tr.

When the engagement between the locking recess sections Tr and the lock levers Ar is released, the pusher Ap presses the portable telephone T in the direction of arrow E, in other words, in the direction of detaching the device-side connector Tc from the holder-side connector Ac, due to the elastic return force of the spring As, whereby the device-side connector Tc is removed from the holder-side connector Ac.

In this way, by means of the simple operation of pressing the operating buttons Ab of the lock levers Ar, it is possible to release the mechanical fixing of the portable telephone T in the on-vehicle holder A, whilst also being able to release the electrical connection between the on-vehicle holder A and the portable telephone T.

In the conventional on-vehicle holder A described above, in a state where the portable telephone T is installed in the on-vehicle holder A, the pressing force of the pusher Ap (elastic return force of the spring As) against the portable telephone T must be greater than the interconnecting force between the holder-side connector Ac and the device-side connector Tc, in other words, the tensile load required to remove the device-side connector Tc from the holder-side connector Ac.

However, even if the holder-side connector Ac and the device-side connector Tc are both manufactured by the same company, since there is large variation in the interconnecting force when the two members are mutually connected, it has been difficult to set the pressing load of the pusher Ap to a suitable value.

In other words, if the pressing load of the pusher Ap is too small with respect to the interconnecting force between the holder-side connector Ac and the device-side connector Tc, then even if the operating buttons Ab of the lock levers Ar are pressed, thereby releasing the mechanical fixing of the portable telephone T with respect to the on-vehicle holder A, the device-side connector Tc will still not detach from the holder-side connector Ac.

Moreover, if the pressing load of the pusher Ap is too great with respect to the interconnecting force between the holder-side connector Ac and the device-side connector Tc, then there is a risk that, when the operating buttons Ab of the lock levers Ar are pressed, the portable telephone T receiving strong pressure from the pusher Ap will be propelled out from the on-vehicle holder A and fall to the ground.

In order to resolve problems of this kind, compositions have been devised wherein a stopper S for stopping the portable telephone T is provided in the on-vehicle holder A as illustrated in FIG. 20, and the pressing load of the pusher Ap is set to a high value, and according to this composition, the pressing load of the pusher Ap can be set readily, and the portable telephone T will not fall out from the on-vehicle holder A.

Nevertheless, in the composition described above, when installing a portable telephone T on the on-vehicle holder A, the stopper S forms an impediment and reduces usability, and moreover, if the portable telephone T is inserted into the on-vehicle holder A at an oblique angle from above, in order to avoid the stopper S, then not only does this impair smooth installation due to oblique interconnection of the device-side connector Tc with respect to the holder-side connector Ac, but it may also cause damage by placing unwanted stress on the holder-side connector Ac and the device-side connector Tc.

The present invention was devised with the foregoing in view, an object thereof being to provide a radio device holder which enables smooth and reliable attachment and detachment of a radio device, without requiring a complicated setting operation during design.

SUMMARY OF THE INVENTION

The radio device holder according to an aspect of the present invention is a radio device holder comprising:

- a holder main unit having a holder-side connector for interconnecting with a device-side connector provided on a radio device;
- a tray having a holding section for holding the radio device in a prescribed attitude, the tray being provided movably with respect to the holder main unit, in a direction along which the device-side connector on the radio device is inserted into or removed from the holder-side connector, between an installation position at which the device-side connector is interconnected with the holder-side connector, and a halt/detachment position at which the device-side connector is separated from the holder-side connector;
- device locking mechanism having a device locking member provided movably on the holding member of the tray between an engagement/disengagement state with respect to a locking recess section provided in the radio device, for holding the radio device in the tray in such a manner that it is detachable therefrom by manual operation of an operator, when the tray is situated in the halt/detachment position;
- lock stopper mechanism provided on the holder main unit, for restricting the device locking member of the device locking mechanism to an immovable state when the tray is situated at the installation position, and holding the radio device held in the tray in such a manner that it cannot be detached from the tray by the device locking mechanism;
- tray impelling mechanism, interposed between the holder main unit and the tray, for impelling the tray constantly in a direction from the installation position towards the halt/detachment position, by means of a pressing force exceeding the interconnecting force between the holder-side connector and the device-side connector;
- tray locking mechanism which comprises a tray locking member provided on the holder main unit to operate in a state engaged with or detached from the tray, and which fixes the tray in the installation position by engaging same with the tray situated at the installation position, and releases the engagement between the tray locking member and the tray by operation of an operating button provided on the tray locking member; and
- tray stopper mechanism provided on the holder main unit, so that the tray stopper mechanism is abutted against the tray moving from the installation position to the halt/detachment position by the pressing force of the tray impelling mechanism, for causing the tray to stop at the halt/detachment position.

According to the foregoing composition, since the tray moving from the installation position towards the halt/detachment position due to the pressing force of the tray impelling mechanism is stopped at the halt/detachment position by the tray stopper mechanism provided on the holder main unit, it is possible to stop the tray reliably at the halt/detachment position, regardless of the magnitude of the pressing force on the tray caused by the impelling force of the tray impelling mechanism.

In other words, since the impelling force of the tray impelling mechanism pressing on the tray can be set appropriately within a wide range of selection, provided that it satisfies the condition of exceeding the interconnecting force between the holder-side connector and the device-side connector, no complex operations relating to the setting of the tray impelling mechanism are required in designing the on-vehicle holder.

Moreover, in the on-vehicle holder according to the embodiment of the invention, by situating the tray holding the radio device at the installation position, mechanical fixing and electrical connection between the on-vehicle holder and the radio device is achieved, whereas by situating the tray at the halt/detachment position, the mechanical fixing and electrical connection between the on-vehicle holder and radio device is released.

Moreover, in the on-vehicle holder according to the embodiment of the invention, since the tray holding the radio device is provided movably with respect to the holder main unit, in the direction in which the device-side connector on the radio device is attached or detached with respect to the holder-side connector on the holder main unit, then the device-side connector on the radio device held in the tray can be attached to and detached from the holder-side connector in a very smooth manner, without applying unwanted stress to the holder-side connector, by moving the tray between the halt/detachment position and the installation position.

Consequently, according to the on-vehicle holder of the present invention, smooth and reliable installation and detachment of the radio device with respect to the on-vehicle holder can be achieved, without requiring complicated setting tasks during design.

BRIEF DESCRIPTION OF THE DRAWINGS

FIG. 10A and FIG. 10B are a general plan view and general side view of a tray in the radio device holder shown in FIG. 1;

FIG. 12A to FIG. 12D are diagrams showing a device locking member in the radio device holder in FIG. 1;

DESCRIPTION OF THE PREFERRED EMBODIMENTS

Below, one embodiment of the present invention is described in detail with reference to the drawings.

Figure 1:
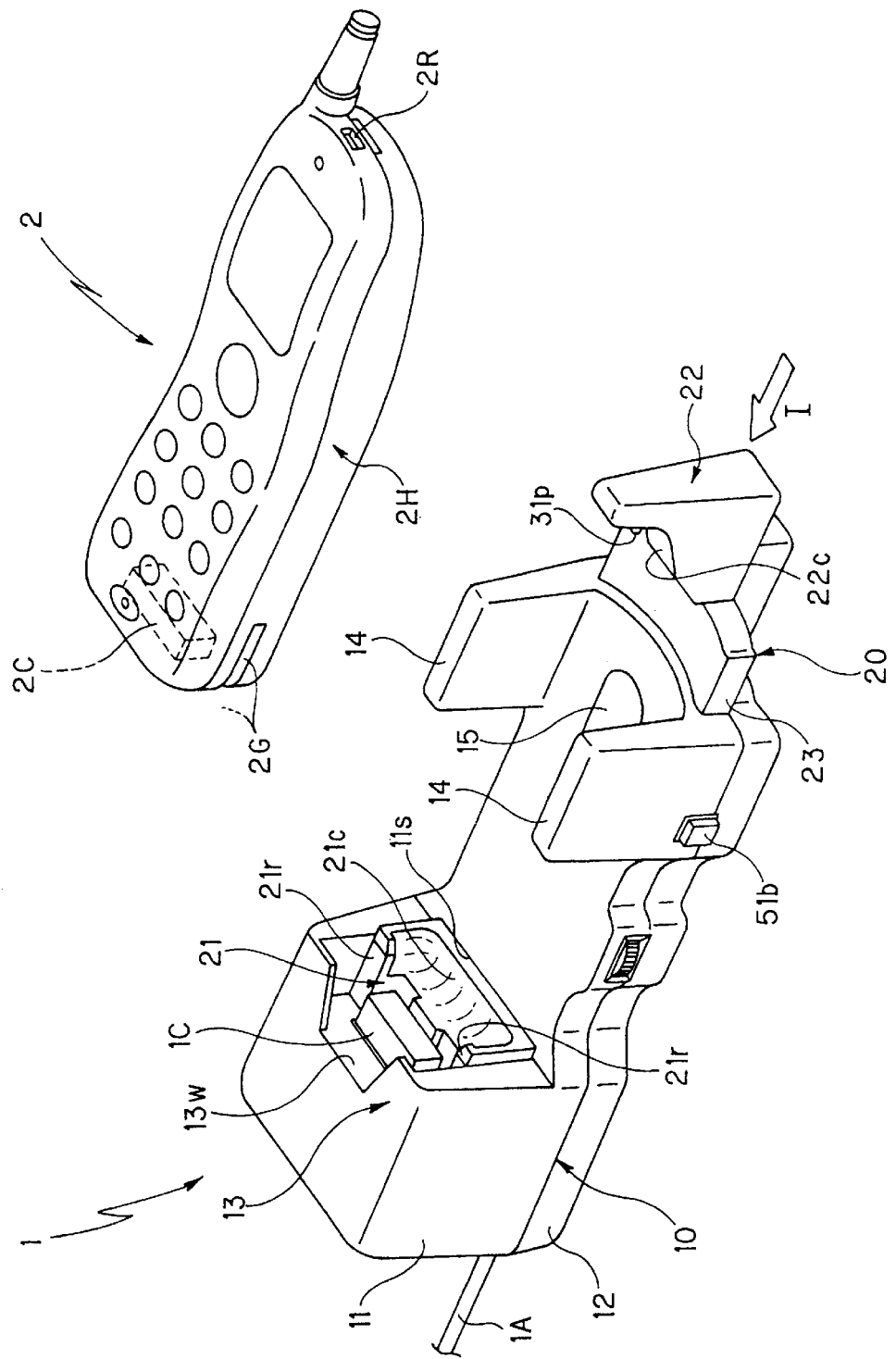
FIG. 1 is an external perspective view showing one embodiment of a radio device holder relating to the present invention, together with a portable telephone.
Figure 2:
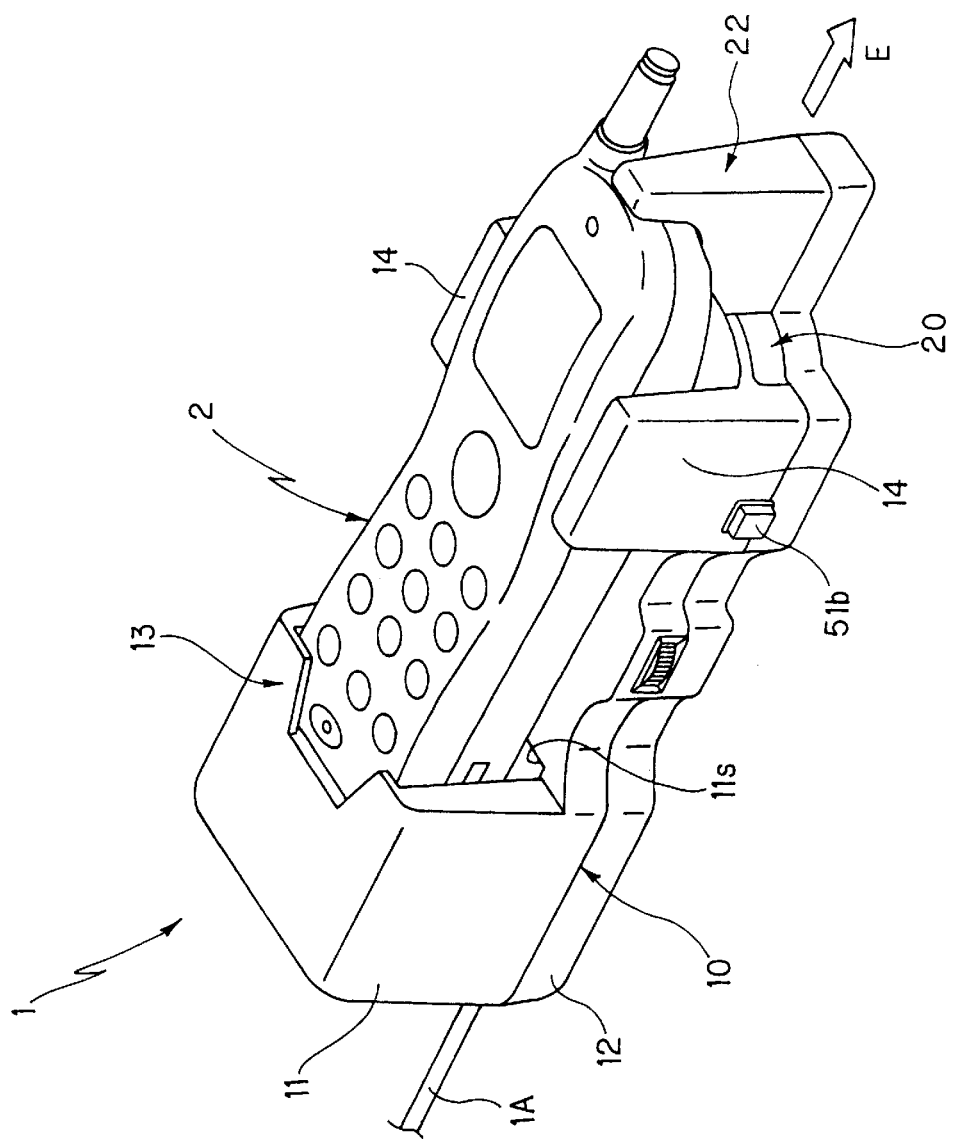
FIG. 2 is an external perspective view of a portable telephone in an installed state in the radio device holder shown in FIG. 1.
Figure 3:
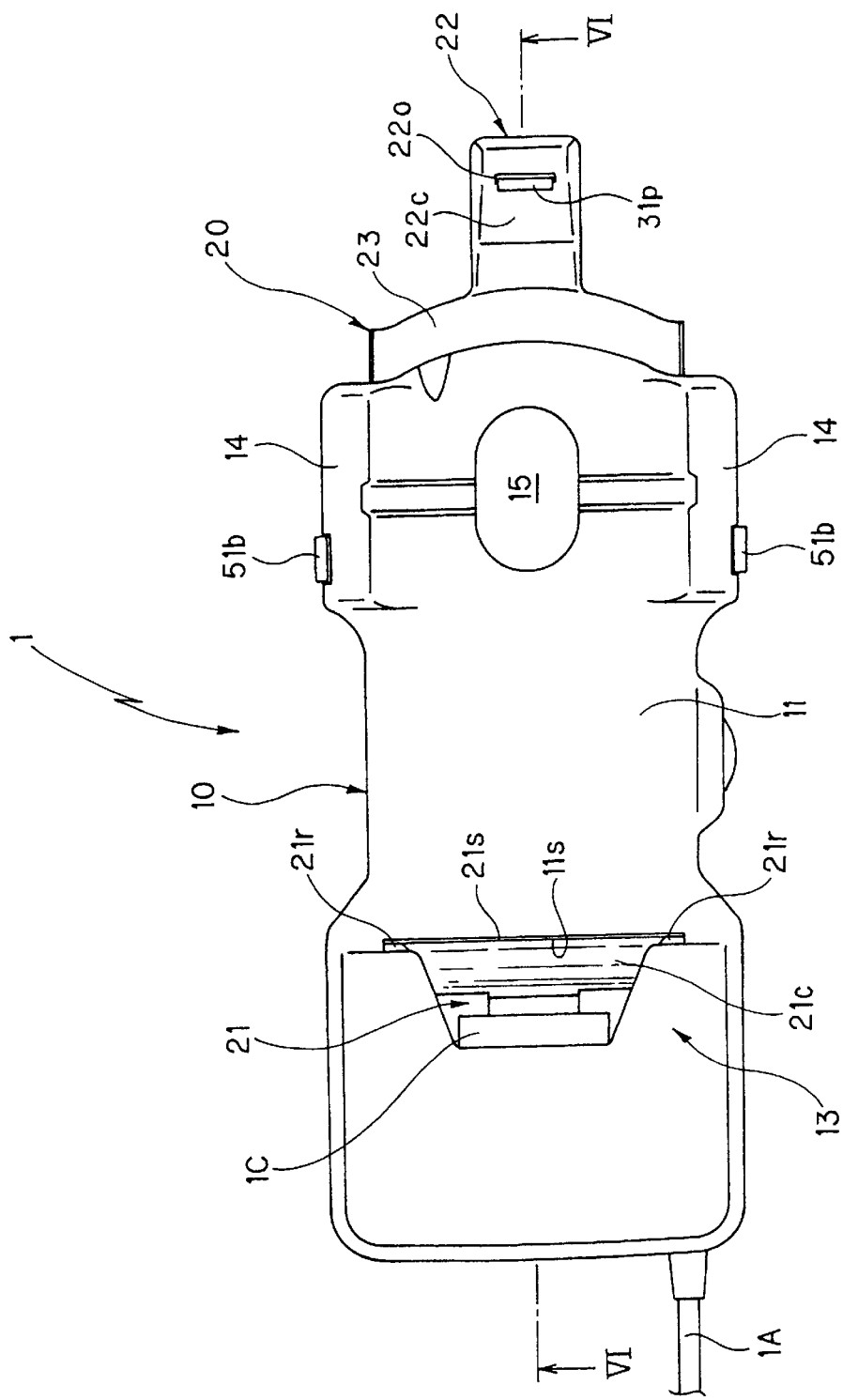
FIG. 3 is a general plan view of the radio device holder shown in FIG. 1.
Figure 4:
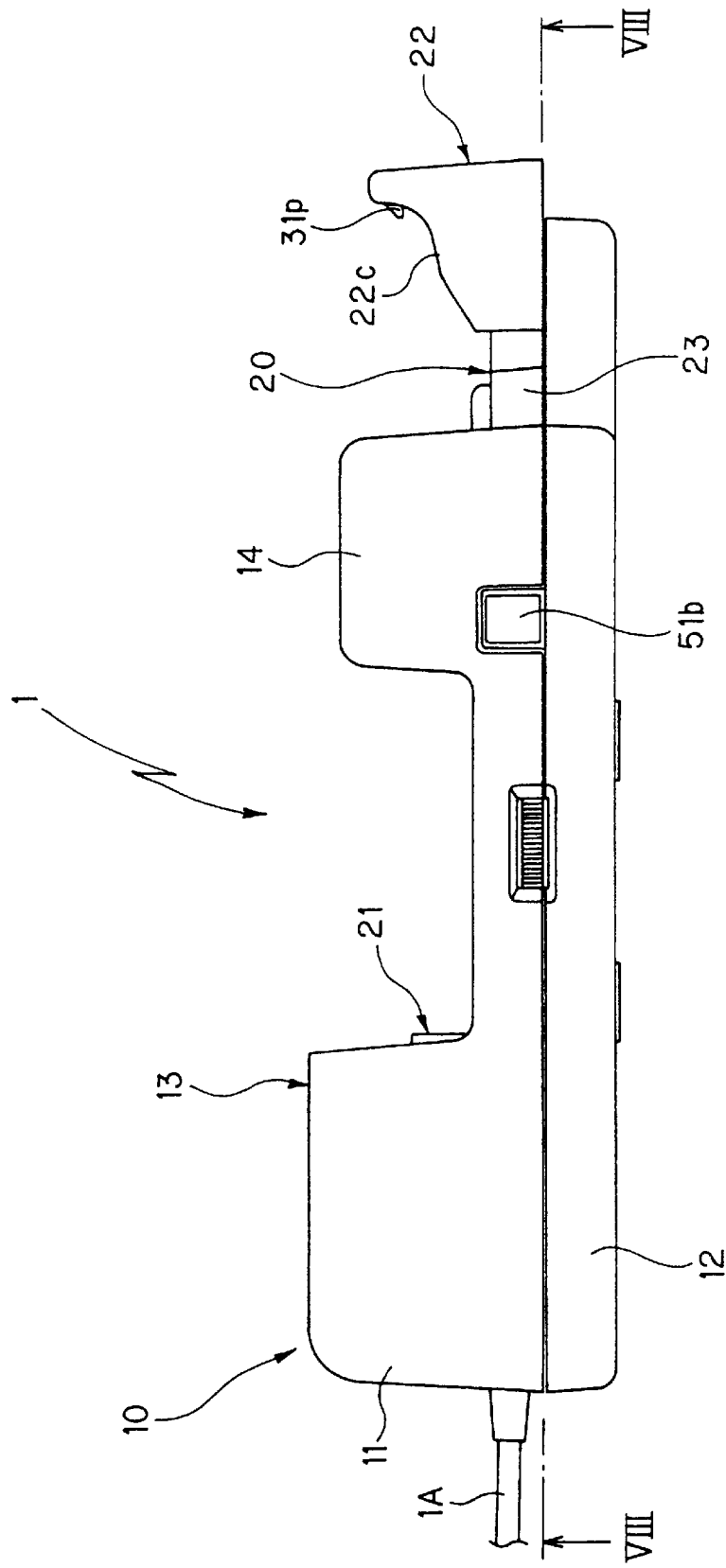
FIG. 4 is a general plan view of the radio device holder shown in FIG. 1.
Figure 5:
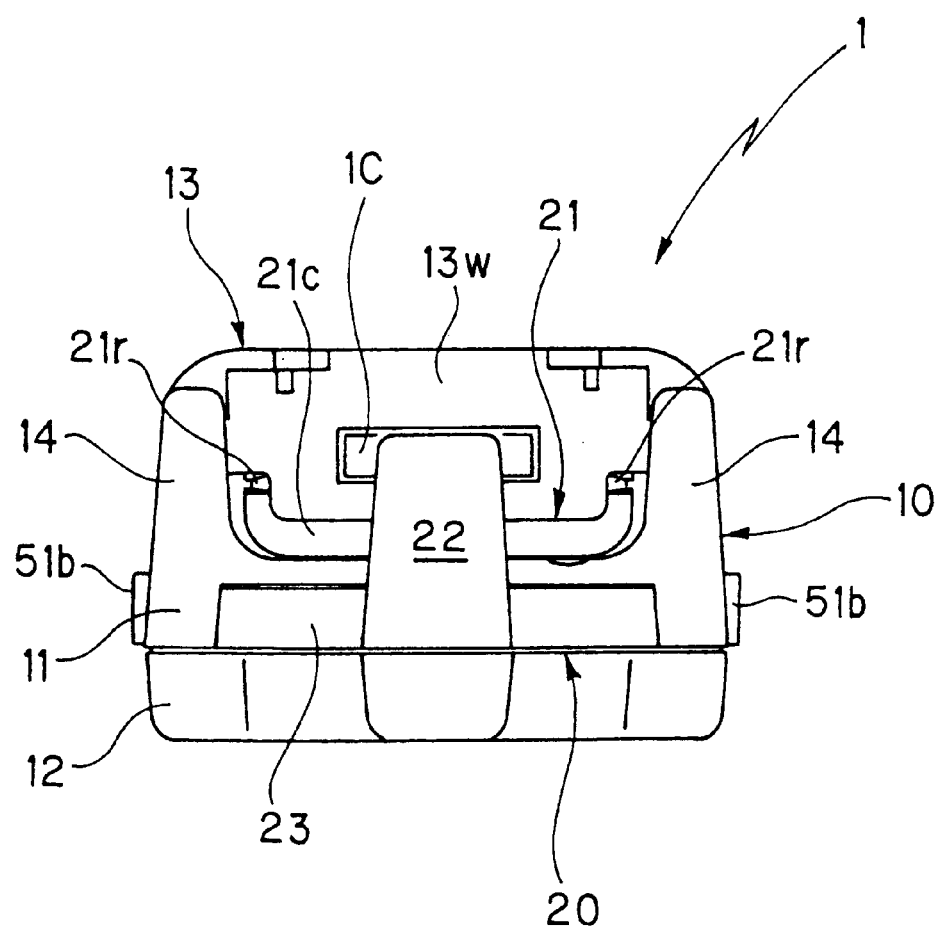
FIG. 5 is a general plan view of the radio device holder shown in FIG. 1.

FIG. 1 and FIG. 2 show examples wherein a radio device holder relating to the present invention is used as an on-vehicle holder for using a portable telephone (radio device) inside a vehicle.

This on-vehicle holder 1 is a device which enables hands-free calls via a portable telephone 2 inside a car, and calls using the external antenna of the vehicle, and by setting a portable telephone 2 in the on-vehicle holder 1, the portable telephone 2 is fixed and held by the on-vehicle holder 1, and a device-side connector 2C of the portable telephone 2 and a holder-side connector 1C of the on-vehicle holder 1 are mutually connected.

The holder-side connector 1C is connected to a control circuit board (not illustrated) which is accommodated in the on-vehicle holder 1 and controls the hands-free functions, and an RF cable 1A which is connected to an external antenna (not illustrated). By setting the portable telephone 2 in the on-vehicle holder 1, the control circuit board and external antenna are electrically connected with the portable telephone 2, and hence the portable telephone 2 can be used to make hands-free calls, or calls via the external antenna.

Here, the portable telephone 2 installed in the on-vehicle holder 1 is provided with a device-side connector 2C for transmitting control signals, and the like, in the lower portion of the case 2H thereof.

Moreover, installation grooves 2G, 2G extending in the longitudinal direction of the portable telephone 2 are formed in the left and right-hand sides of the lower portion of the case 2H, and a locking recess section 2R is formed in the top portion of the case 2H.

As shown in FIG. 1 to FIG. 5, the on-vehicle holder 1 according to the present embodiment is provided with a holder main unit 10 fitted to the vehicle, and a tray 20 provided slidably with respect to this holder main unit 10.

The holder main unit 10 comprises a mutually assembled upper case 11 and lower case 12, a pocket section 13 for accommodating the lower portion of the portable telephone 2 installed in the on-vehicle holder 1 being formed on one end portion of the upper case 11, and a pair of guard sections 14, 14 for enclosing the right and left-hand side portions of the portable telephone 2 being formed on the other end portion of the upper case 11.

Furthermore, a recess section 15 is formed in the upper case 11 of the holder main unit 10, in order to prevent interference with a belt clip installation fixture (not illustrated) when a portable telephone 2 fitted with a belt clip installation fixture (not illustrated) on the rear portion of the case 2H in installed.

Here, the holder-side connector 1C in the holder main unit 10 is positioned in a state where it coincides with an opening formed in a dividing wall 13w of the pocket section 13, and similarly to the connector of a conventional on-vehicle holder, or the like, it is held in a floating state via a spring, or the like, which is not illustrated.

As shown in FIG. 6 to FIGS. 11A and 11B, the tray 20 constituting the on-vehicle holder 1 comprises a first side holding section (holding section) 21, a second side holding section (holding section) 22, and an intermediate section 23 linking these holding sections 21, 22 into a single member, and the portable telephone 2 is held in a prescribed attitude extending in an approximately horizontal direction, by the first side holding section 21 and the second side holding section 22.

The tray 20 is provided movably with respect to the aforementioned holder main unit 10, in the direction of insertion and removal of the device-side connector 2C on the installed portable telephone 2 with respect to the holder-side connector 1C, between an installation position (see FIG. 7 and FIG. 9) in which the device-side connector 2C of the portable telephone 2 held in the tray 20 is interconnected completely with the holder-side connector 1C, and a halt/detachment position (see FIG. 6 and FIG. 8) in which the device-side connector 2C of the portable telephone 2 held in the tray 20 is completely separated from the holder-side connector 1C.

The first side holding section 21 of the tray 20 is positioned to the inside of the pocket section 13 of the holder main unit 10, and comprises a cradle 21c formed in a sunken fashion following the shape of the base portion of the portable telephone 2, and a pair of guide ribs 21r, 21r which engage with the left and right-hand installation grooves 2G, 2G on the portable telephone 2.

Furthermore, the second side holding section 22 of the tray 20 is positioned in a projecting fashion from the other end portion of the upper case 11 of the holder main unit 10 on which the guard section 14 is formed, and comprises a cradle 22c formed in a curved shape following the shape of the top section of the portable telephone 2.

Tray locking pawls 20r forming constituent elements of tray locking mechanism 50, described hereinafter, are formed respectively projecting from the right and left-hand sides of the intermediate section 23 of the tray 20.

Device locking mechanism 30 for holding a portable telephone 2 installed in the tray 20 is provided in the second side supporting section 22 of the tray 20, the device locking mechanism 30 being constituted by a device locking member 31 supported swingably on the inner portion of the second side holding section 22, and a small spring 32 which presses this device locking member 31 in a prescribed direction.

Figure 11A:
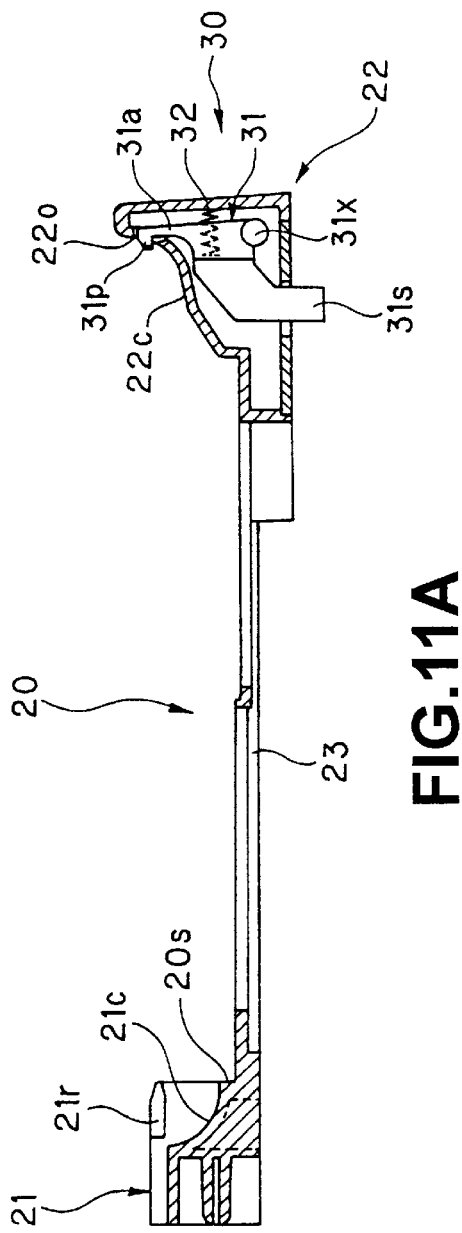
FIG. 11A and FIG. 11B are a sectional view along XIa—XIa and a sectional view along XIb—XIb in FIG. 10A.
Figure 11B:
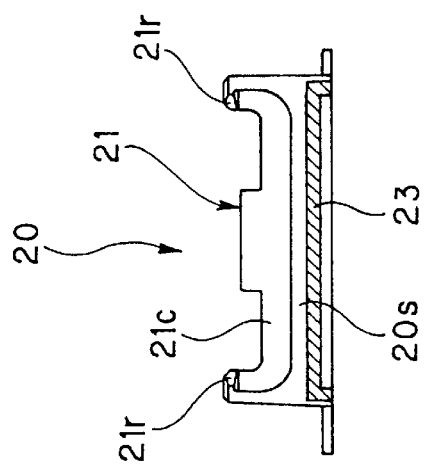
Figure 13A:
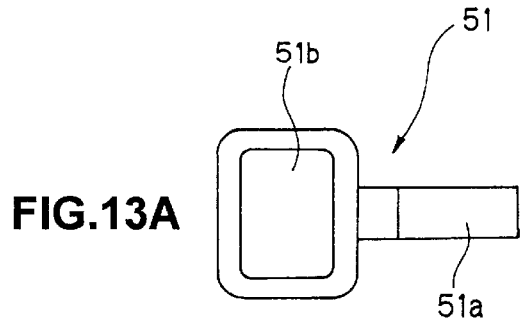
FIG. 13A to FIG. 13D are diagrams showing a tray locking member in the radio device holder in FIG. 1.
Figure 13B:
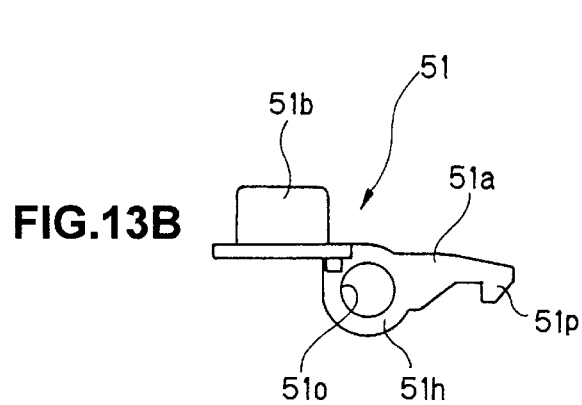
Figure 13D:
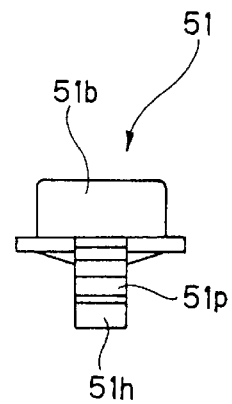
Figure 13C:
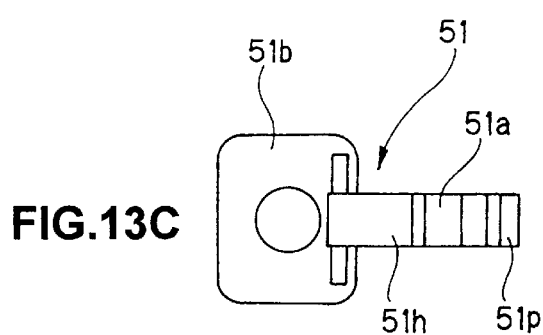

As illustrated in FIGS. 12A to 12D, the device locking member 31 comprises an arm 31a having a pawl 31p on the front end thereof, a stopper arm 31s extending in a downward direction, and a supporting axle 31x projecting to the left and right-hand sides, and as illustrated in FIG. 11A, it is supported swingably on the second side holding section 22 about the supporting axle 31x, whilst being pressed constantly from an opening 22o formed in the second side holding section 22 in the direction of projection of the pawl 31p, by means of the aforementioned small spring 32.

In other words, when the pawl 31p projecting from the cradle 22c of the second side holding section 22 is pressed, the device locking member 31 is caused to rotate about the supporting axle 31x, against the pressing force of the small spring 32, and the pawl 31p is withdrawn, and when the pressure is released, the pawl 31p is caused to project into the cradle 22c via the opening 22o by means of the pressing force of the small spring 32.

Figure 6:
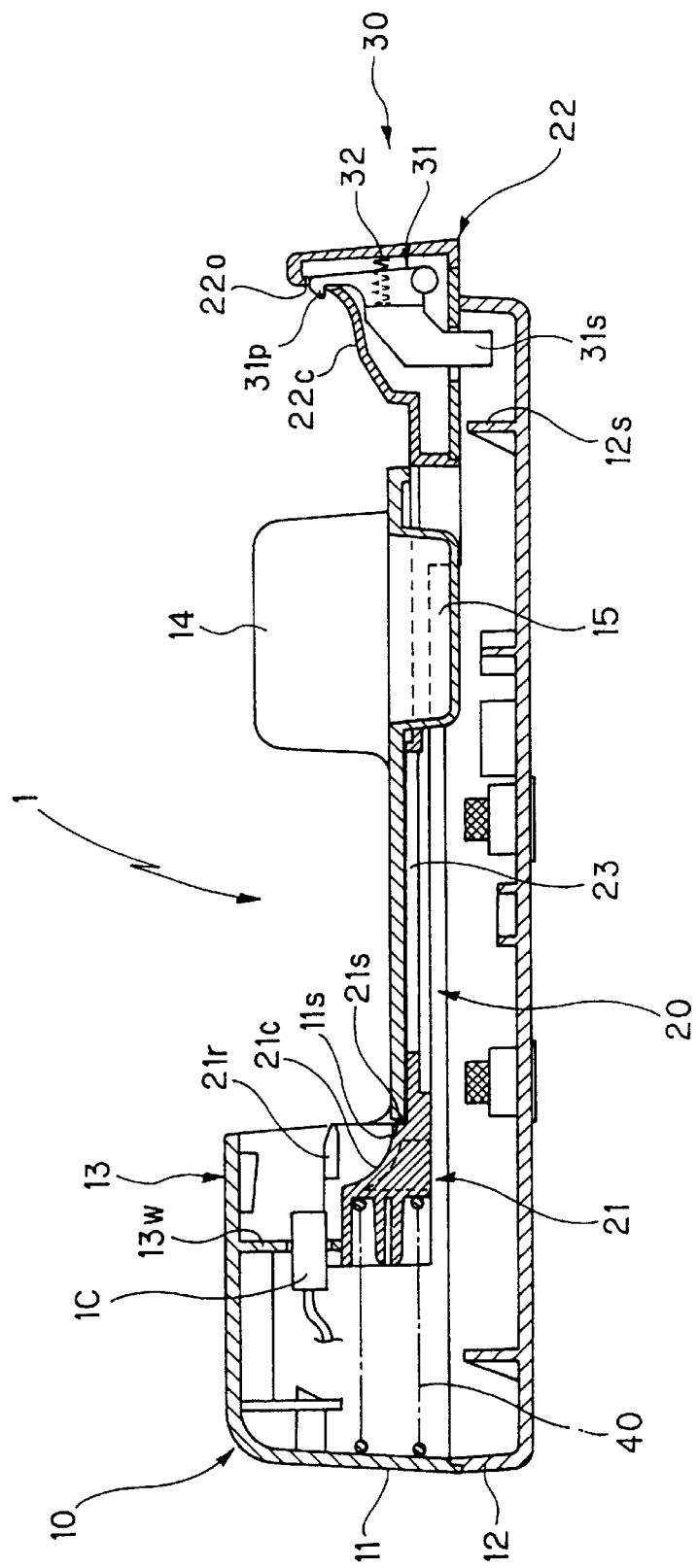
FIG. 6 is a sectional view along VI—VI in FIG. 3.
Figure 7:
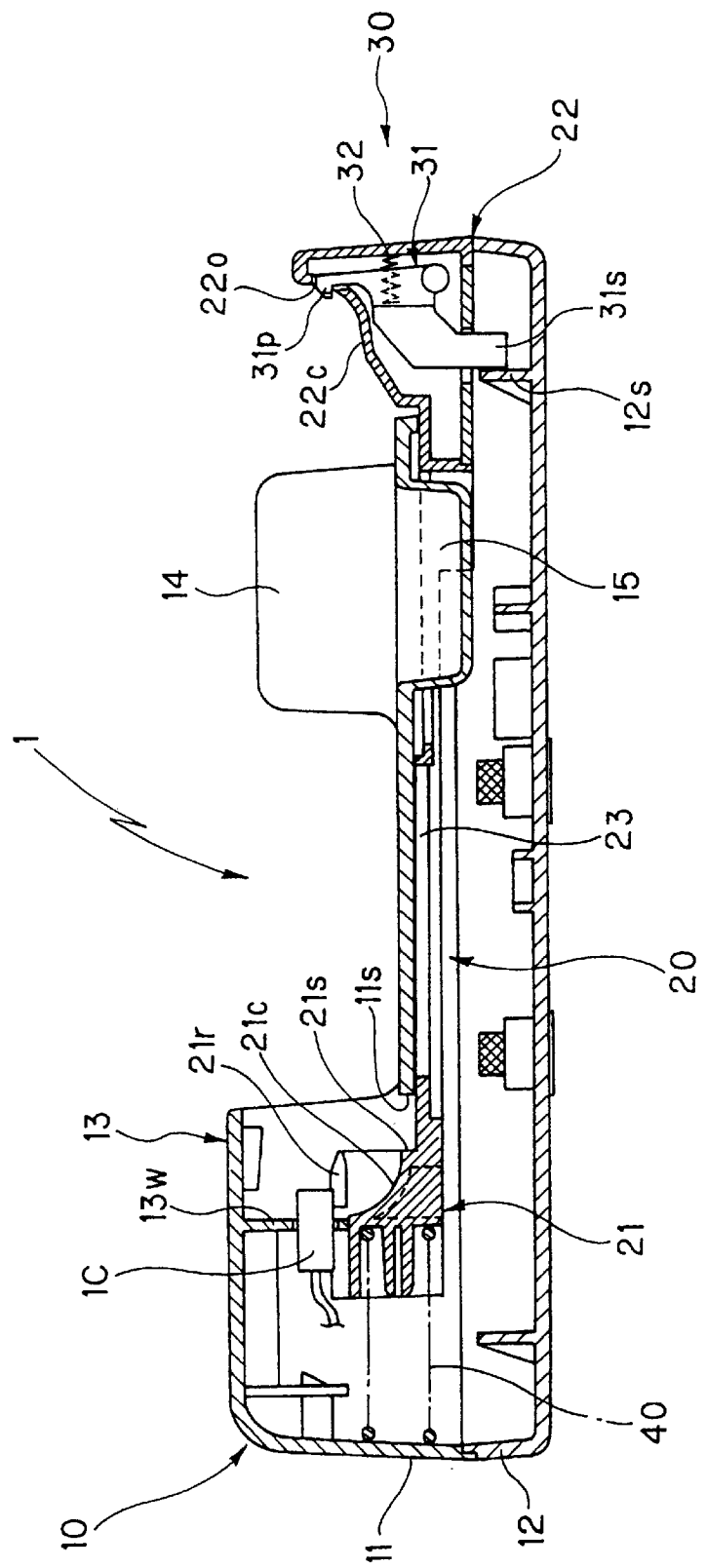
FIG. 7 is a sectional side view of the radio device holder shown in FIG. 1.

On the other hand, as shown in FIG. 6 and FIG. 7, a stopper rib (lock stopper mechanism) 12s is formed in the lower case 12 of the holder main unit 10, in such a manner that the contact or very close proximity thereof with respect to the stopper arm 31s of the aforementioned device locking member 31 when the tray 20 is disposed in the installation position (as indicated in FIG. 7) restricts the swinging movement of the device locking member 31, thereby immobilizing same.

In other words, in a state where the tray 20 is disposed in the installation position, then even if the pawl 31p projecting from the cradle 22c of the second side supporting section 22 is pressed, the device locking member 31 will not rotate and the pawl 31p will remain in a projecting state from the cradle 22c.

As illustrated in FIG. 6 to FIG. 9, a spring (tray pressing mechanism) 40 which presses the tray 20 in a direction moving from the installation position to the halt/detachment position is interposed between the upper case 11 of the holder main unit 10 and the tray 20.

This spring 40 impels the tray 20 by means of a pressing force which is reliably greater than the interconnecting force between the holder-side connector 1C and the device-side connector 2C, in other words, the tensile load required to detach the device-side connector 2C from the holder-side connector 1C, whilst taking product variation into account.

Here, in a state where the tray 20 is situated at the halt/detachment position, a front step section 21s of the first side holding section 21 of the tray 20 confronts the opening edge section (tray stopper mechanism) 11s of the pocket section 13 in the upper case 11 of the holder main unit 10.

In other words, the tray 20 pressed from the installation position towards the halt/detachment position by the spring 40 is stopped in the halt/detachment position by means of the front step section 21s of the first side holding section 21 confronting the opening edge section 11s of the holder main unit 10.

Tray stopper mechanism for stopping the tray 20 impelled by the spring 40 in the halt/detachment position may be constituted not only by the opening edge section 11s of the pocket section 13 described above, but also by means of a rib, or the like, formed at a desired position on the holder main unit 10 in such a manner that it confronts an appropriate position on the tray 20 when it arrives at the halt/detachment position.

Figure 8:
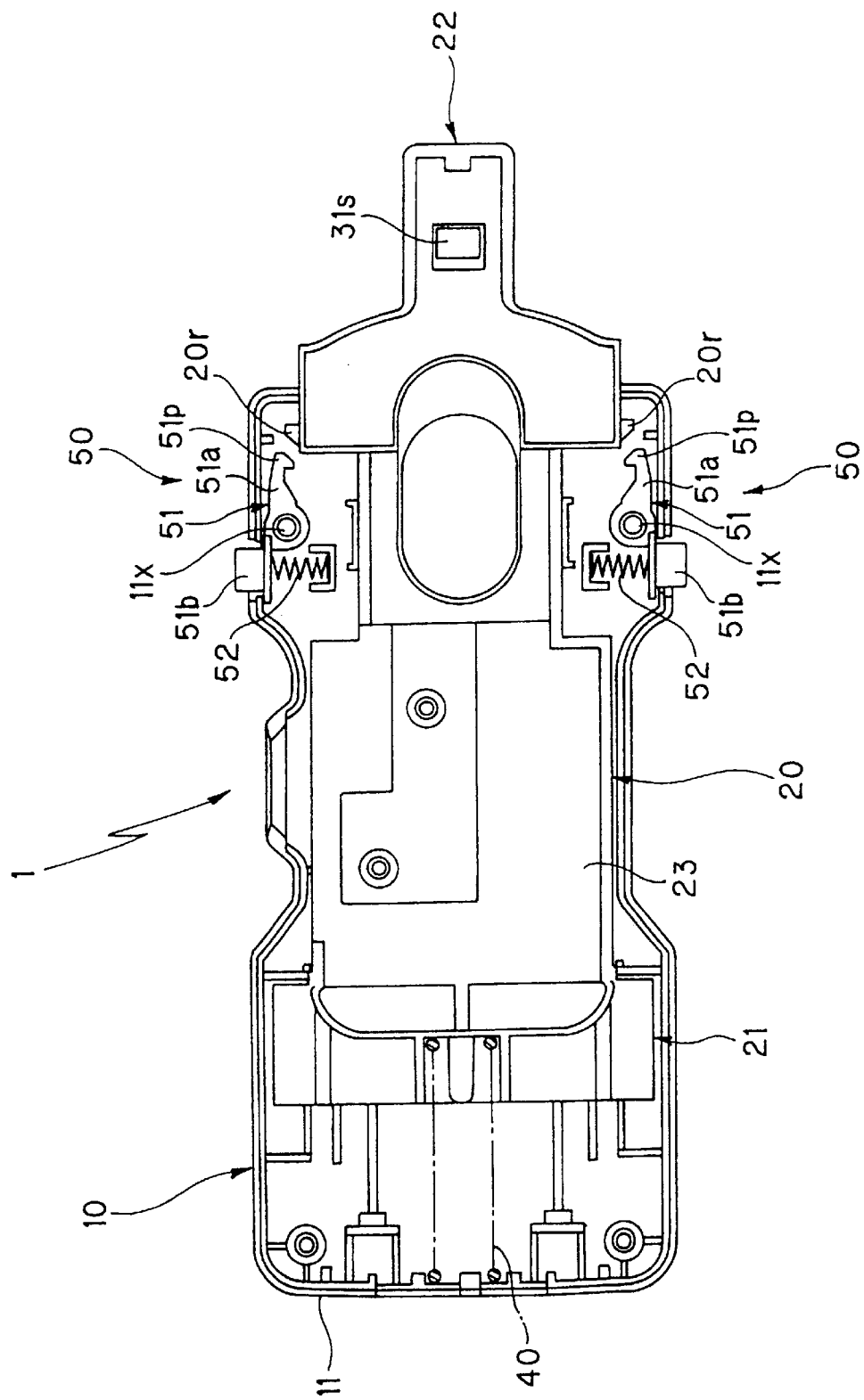
FIG. 8 is a sectional view along VIII—VIII in FIG. 4.
Figure 9:
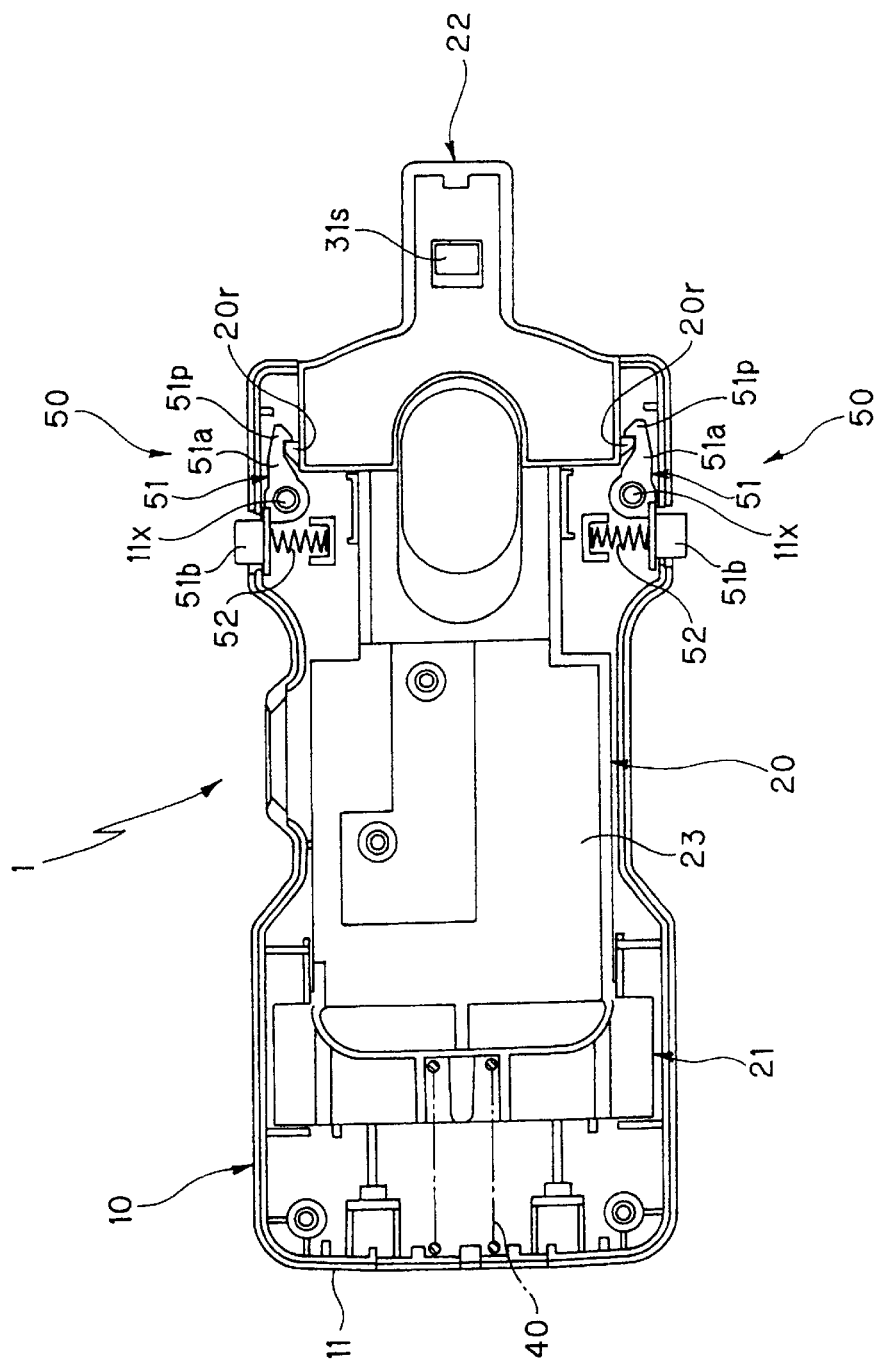
FIG. 9 is a sectional under side view of the transmission device shown in FIG. 1.

As shown in FIG. 8 and FIG. 9, tray locking mechanism 50 for restricting the tray 20 to the installation position is provided respectively in the right and left-hand side regions of the tray 20, the tray locking mechanism 50 being constituted respectively by a tray locking member 51 supported swingably inside the holder main unit 10, a small spring 52 pressing the tray locking member 51 in a prescribed direction, and the tray lock pawls 20r described previously.

Each aforementioned tray locking member 51 comprises an arm 51a having a pawl 51p on the front end thereof, as shown in FIGS. 13A to 13D, an operating button 51b, and a hub 51h formed with an axle hole 51o, and as shown in FIG. 8 and FIG. 9, the tray locking member 51 is supported swingably on the holder main unit 10 about a supporting axle 11 which is inserted into the axle hole 51o, and is pressed constantly by the small spring 52 in a direction whereby the pawl 51p approaches the tray 20 and the operating button 51b projects to the exterior of the holder main unit 10.

In other words, when the operating button 51b projecting from the holder main unit 10 is pressed, the tray locking member 51 is rotated about the supporting axle 11x against the pressing force of the small spring 52, and the pawl 51p moves in a direction away from the tray 20, whereas when this pressure is released, the tray locking member 51 returns to its initial position due to the pressing force of the small spring 52.

Figure 14:
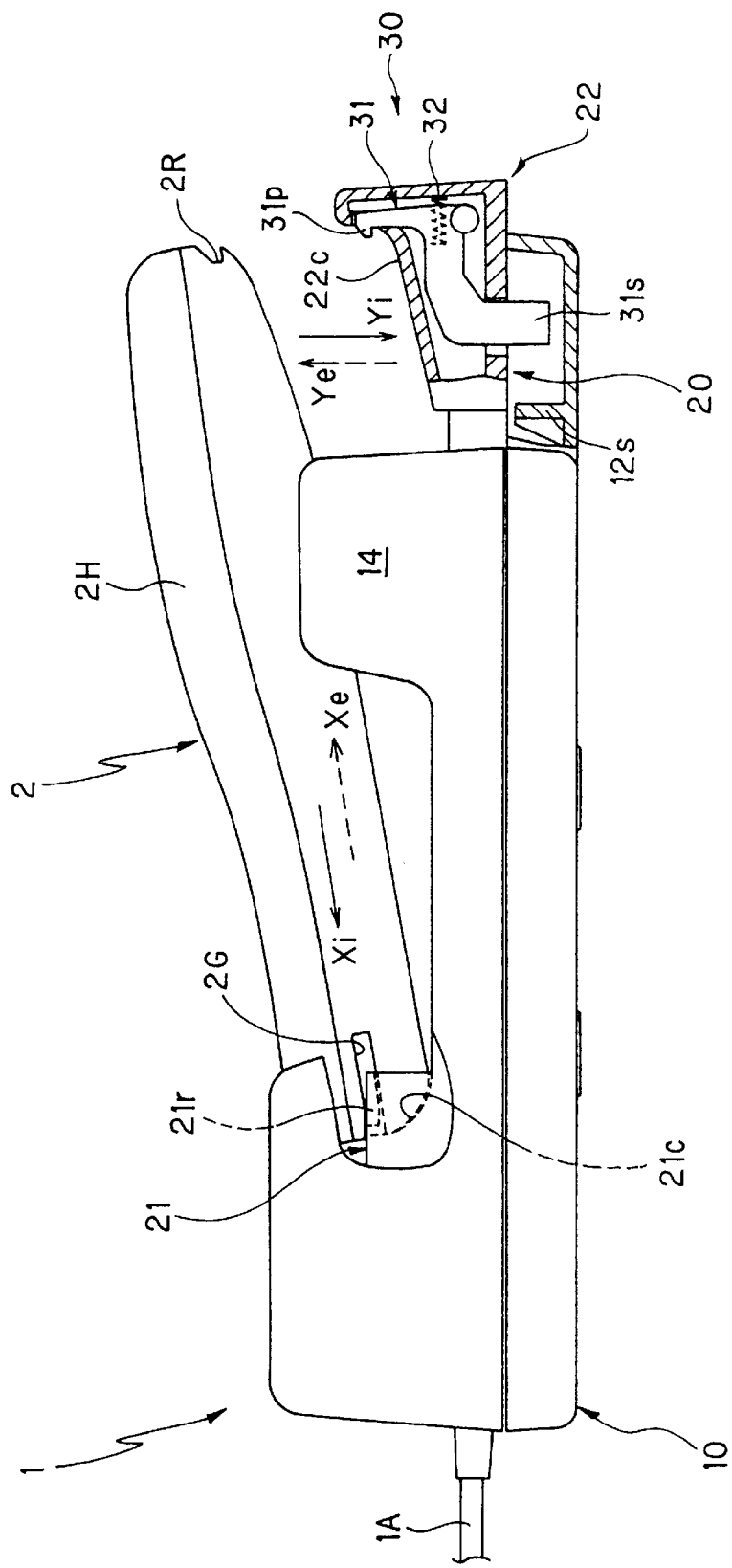
FIG. 14 is a conceptual diagram illustrating the installation and detachment of a portable telephone with respect to the radio device holder illustrated in FIG. 1.

If the portable telephone 2 is installed in the on-vehicle holder 1 of the composition described above, firstly, the left and right-hand guide ribs 21r, 21r in the first side holding member 21 are inserted into the installation grooves 2G, 2G, with respect to a tray 20 disposed at the halt/detachment position as illustrated in FIG. 14, and after the portable telephone 2 has been inserted obliquely from above as indicated by the solid arrow Xi, the top portion of the portable telephone 2 is pushed towards the second side holding section 22 as indicated by the solid arrow Yi.

Figure 15:
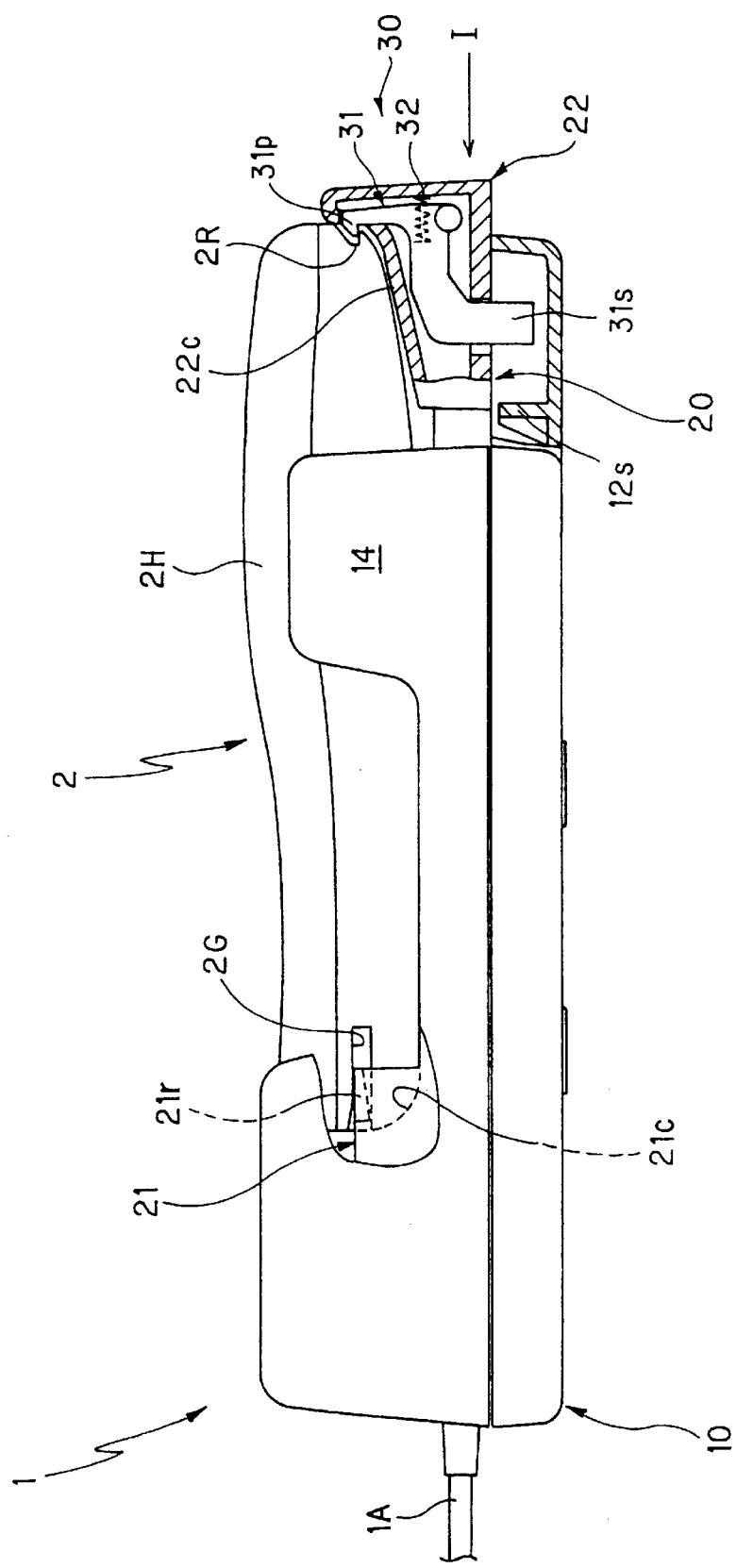
FIG. 15 is a conceptual diagram illustrating the installation and detachment of a portable telephone with respect to the radio device holder illustrated in FIG. 1.

In this case, by means of the pawl 31p of the device locking member 31 provided in the second side holding section 22 interlocking with the locking recess section 2R in the portable telephone 2 due to the pressing force of the small spring 32, the portable telephone 2 is held in the tray 20 in a state where it is supported by the first side holding section 21 and the second side holding section 22, as shown in FIG. 15.

Moreover, the base section of the case 2H faces with the cradle 21c of the first side holding section 21, and the top section of the case 2H faces with the cradle 22c of the second side holding section 22, in addition to which, the installation grooves 2G, 2G engage with the guide ribs 21r, 21r of the first side holding section 21, and the pawl 31p of the device locking member 31 engages with the locking recess section 2R, whereby the portable telephone 2 is held in the tray 20 in a state where movement thereof is restricted in each of the forward/backward, leftward/rightward and upward/downward directions.

Here, in the device locking mechanism 30 provided in the second side holding section 22 of the tray 20, by setting the pressing force of the small spring 32 to a very small value, and by means of the device locking member 31 turning and the pawl 31p detaching from the locking recess section 2R, when a suitable upwards force is applied to the portable telephone 2 held in the tray 20 as described above, in accordance with the weight balance about the supporting axle 31x in the device locking member 31, and also the appropriate shape of the pawl 31p and locking recess section 2R, it is possible to remove the portable telephone 2 from the tray 20. In other words, the portable telephone 2 held by the device locking mechanism 30 is held in a detachable manner with respect to the tray 20.

Figure 17:
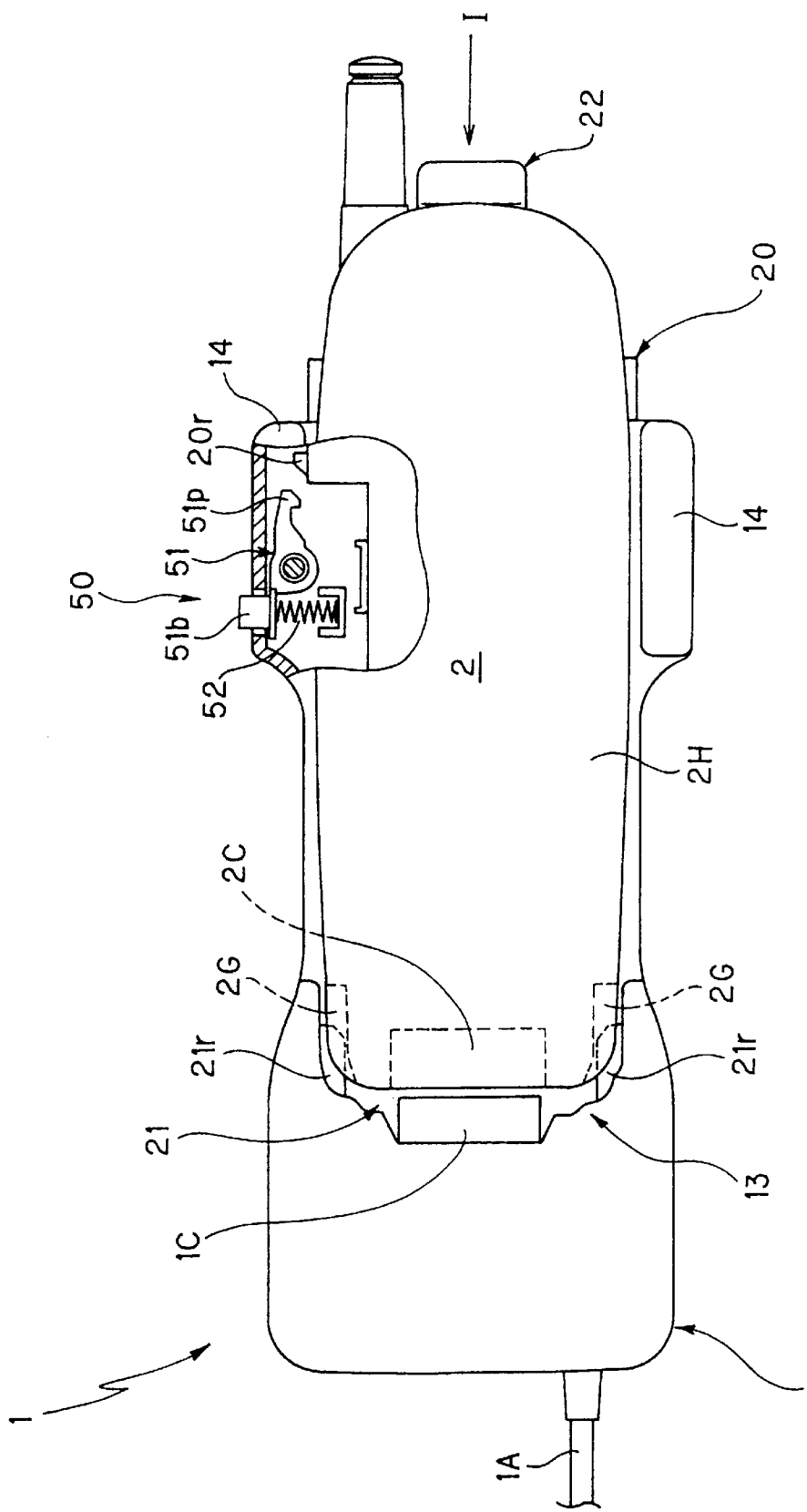
FIG. 17 is a conceptual diagram illustrating the installation and detachment of a portable telephone with respect to the radio device holder illustrated in FIG. 1.

When the portable telephone 2 has been held in the tray 20 disposed in the halt/detachment position as described above, the tray 20 is pressed into the holder main unit 10 against the force of the spring 40, as indicated by the arrow I in FIG. 15 and FIG. 17.

Figure 16:
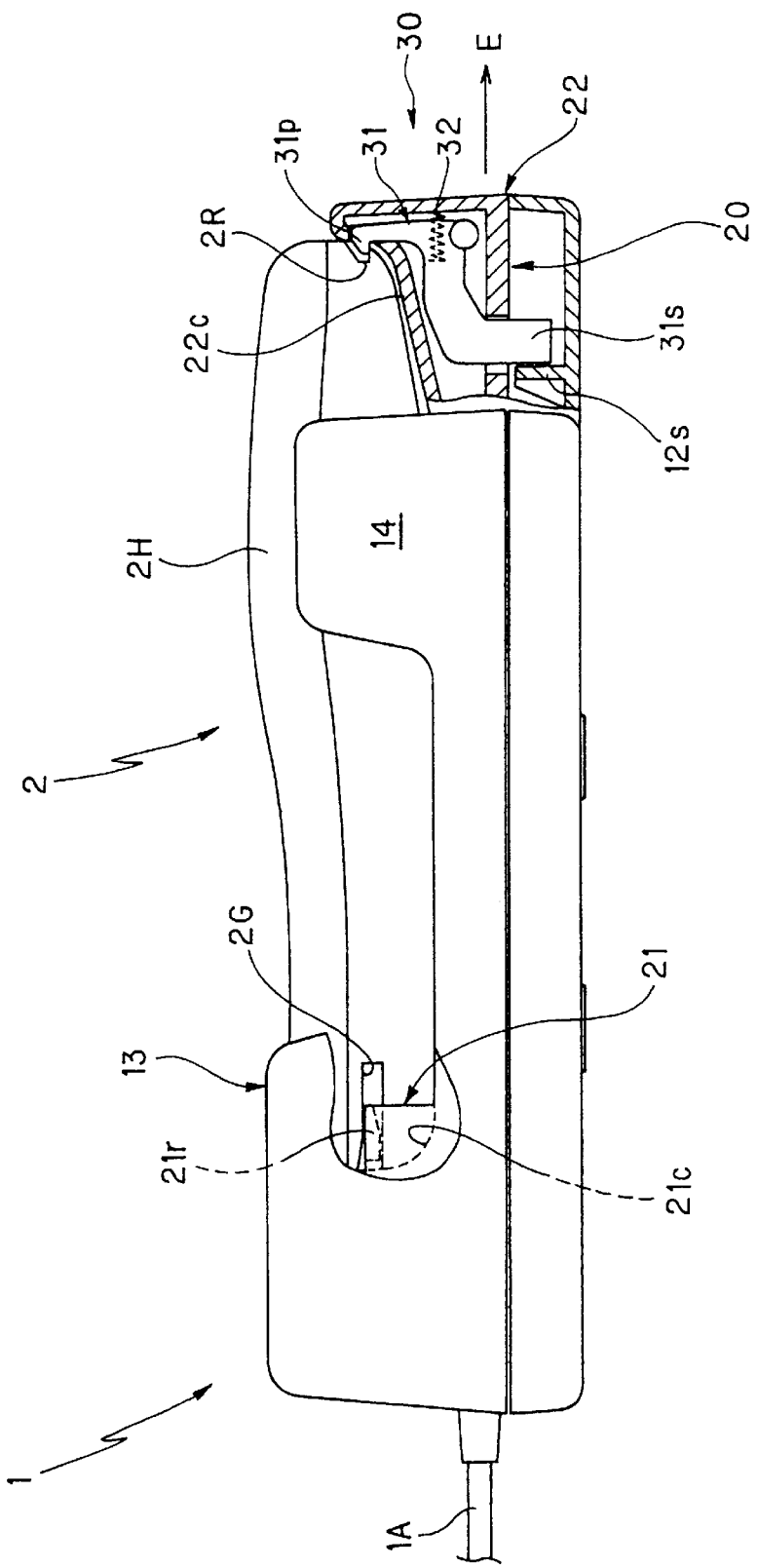
FIG. 16 is a conceptual diagram illustrating the installation and detachment of a portable telephone with respect to the radio device holder illustrated in FIG. 1.
Figure 18:
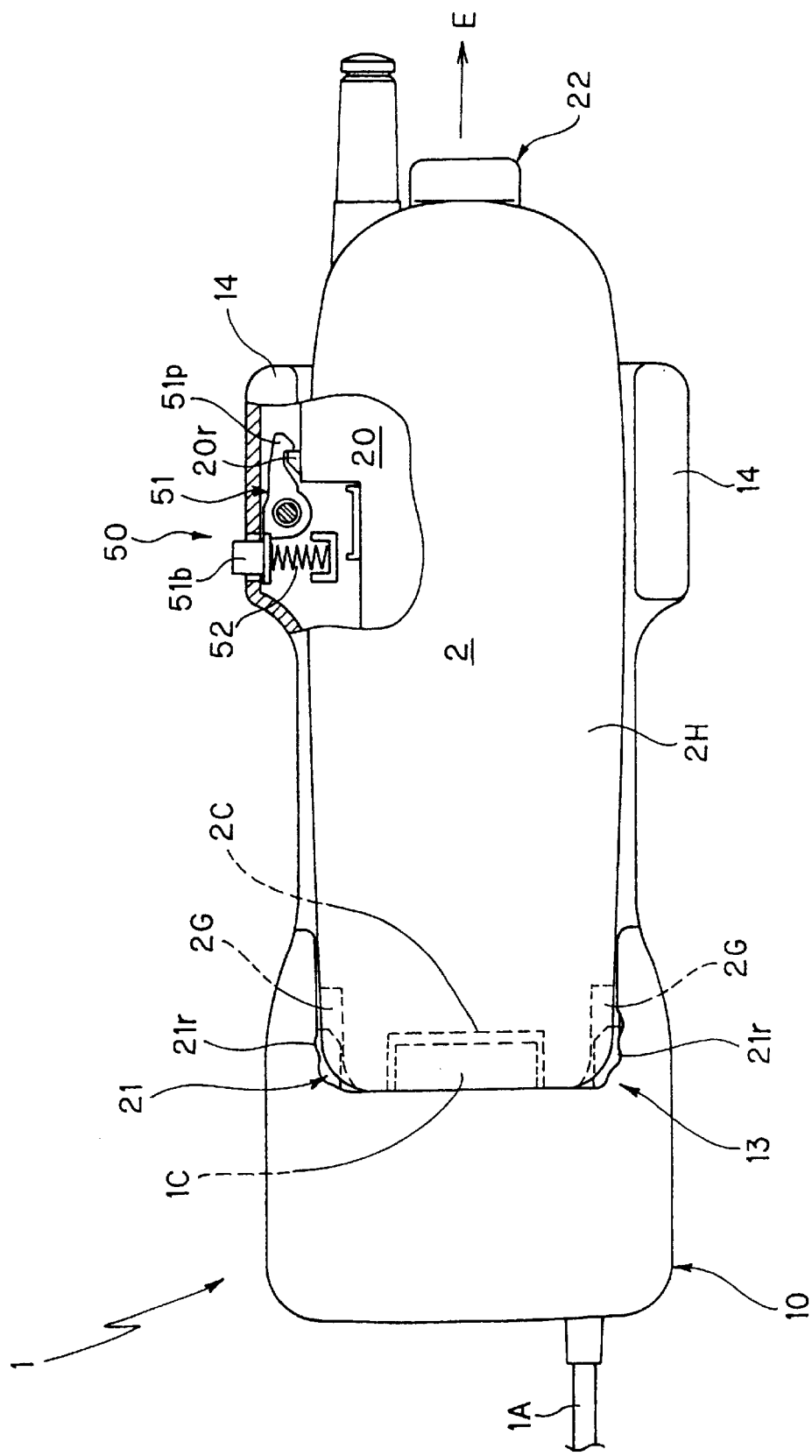
FIG. 18 is a conceptual diagram illustrating the installation and detachment of a portable telephone with respect to the radio device holder illustrated in FIG. 1.
Figure 19:
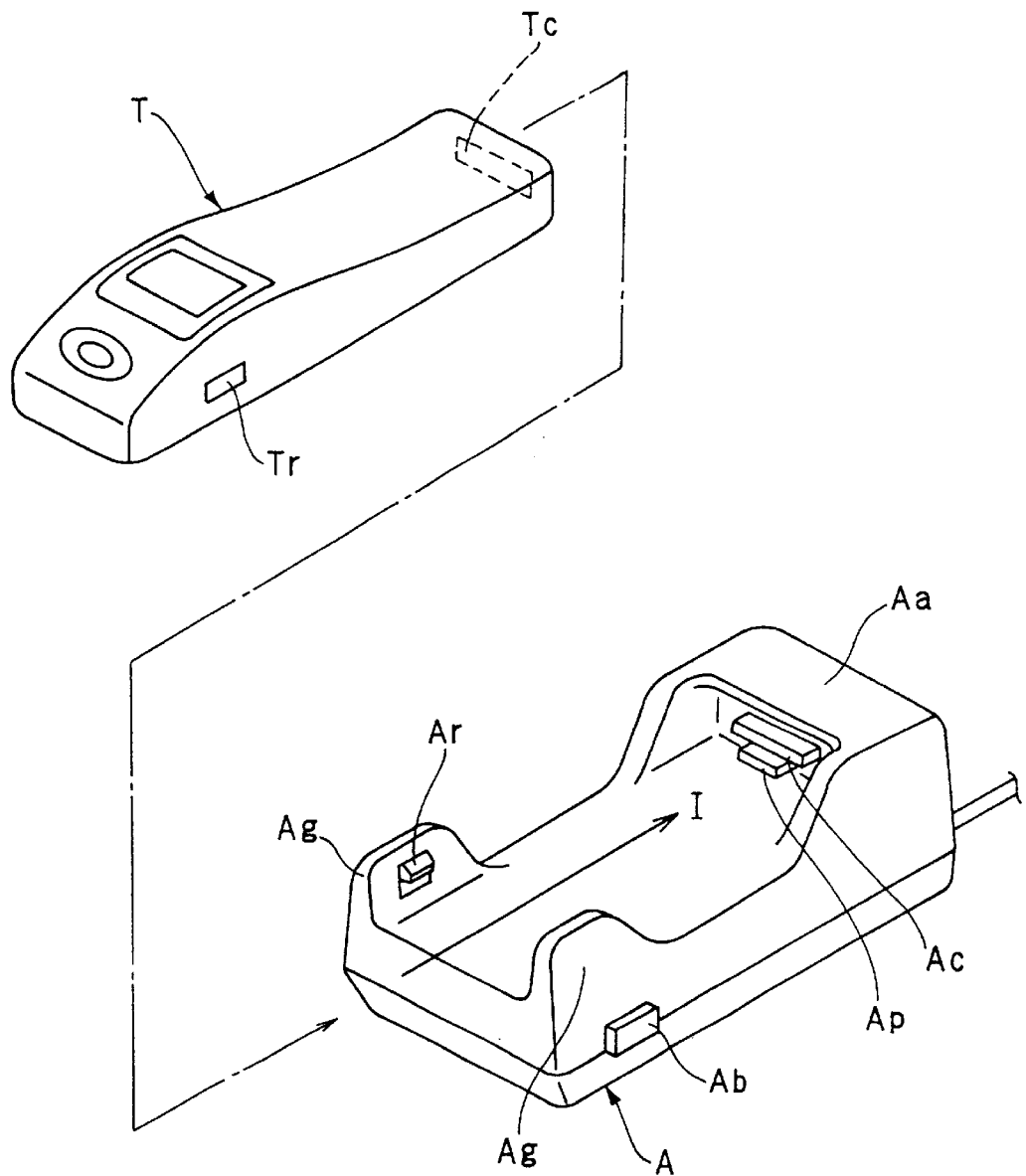
FIG. 19 is an external perspective diagram showing a conventional radio device holder, together with a radio device.
Figure 20:
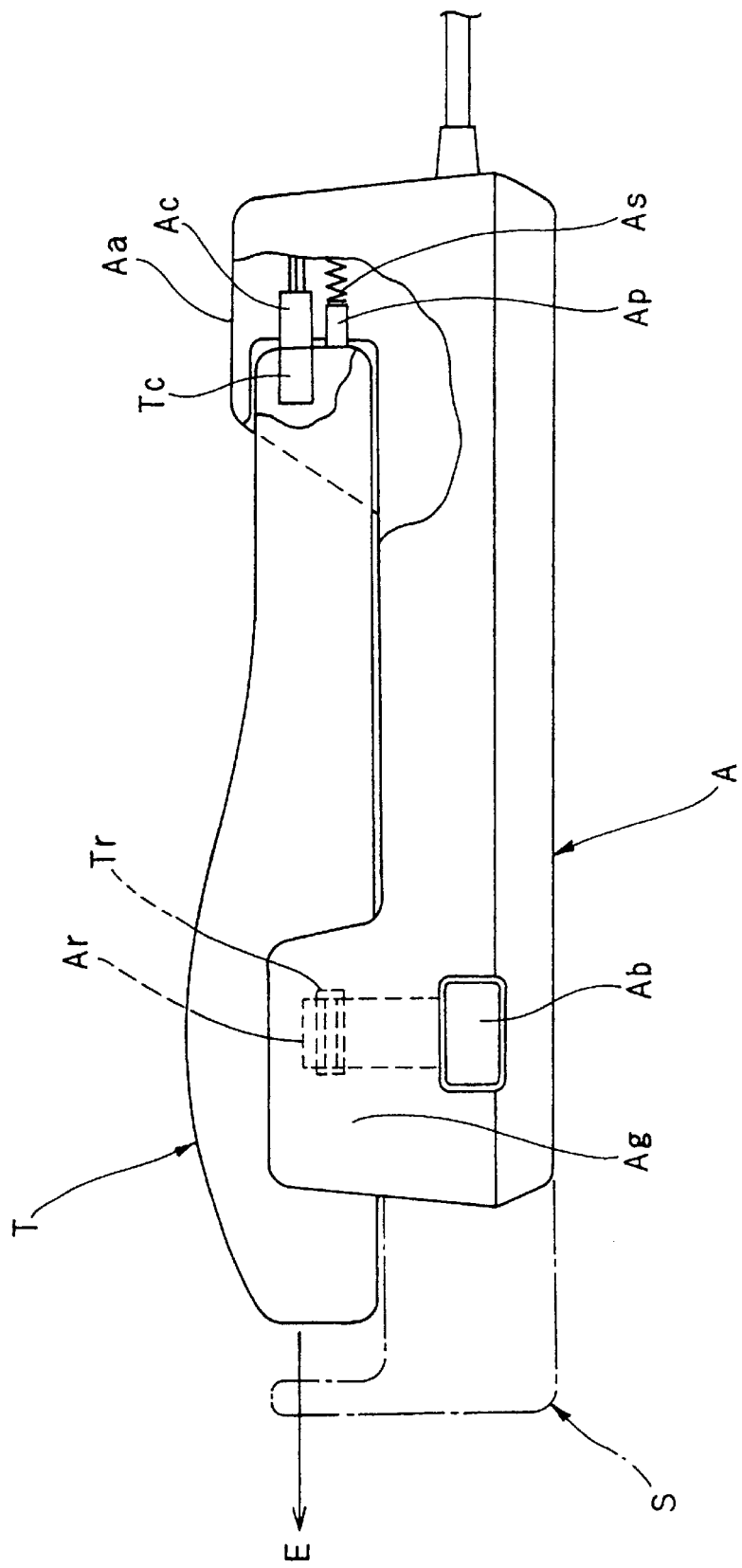
FIG. 20 is a general side view showing a cutaway of the principal parts of a conventional radio device holder.

Thereby, the device-side connector 2C of the portable telephone 2 held in the tray 20 gradually engages with the holder-side connector 1C and when the tray 20 reaches the installation position shown in FIG. 16 and FIG. 18, the holder-side connector 1C and the device-side connector 2C become completely interconnected.

Moreover, if the tray 20 moves from the halt/detachment position to the installation position, then the pawls 51p of the tray locking mechanism 50 ride up over the tray locking pawls 20r, and when the tray 20 has reached the installation position indicated in FIG. 18, the pawls 51p of the tray locking members 51 engages with the tray locking pawl 20r due to the force of the small spring 52.

Thereby, the tray 20 is restricted from returning to the halt/detachment position due to the force of the spring 40, and consequently the tray 20 is fixed in the installation position.

Moreover, in a state where the tray 20 is disposed in the installation position as shown in FIG. 16, the swinging motion of the device locking member 31 is restricted by the stopper rib (lock stopper mechanism) 12s provided on the lower case 12 of the holder main unit 10, and therefore even if an external pressure is imparted so as to raise up the portable telephone 2, the portable telephone 2 will remain fixed reliably in the tray 20, due to the device locking mechanism 30.

Moreover, if the tray 20 is fixed in the installation position, then the base portion of the case 2H in the portable telephone 2 is accommodated in the pocket section 13 of the holder main unit 10, as shown in FIG. 2, FIG. 16 and FIG. 18, and the guard portions 14, 14 will be situated at the left and right-hand side sections of the case 2H in the portable telephone 2, thereby restricting movement of the portable telephone 2 in any of the forward/backward, leftward/rightward and upward/downward directions.

In this way, when the portable telephone 2 has been held in the tray 20 at the halt/detachment position, by pushing the tray 20 in to the installation position, the portable telephone 2 is mechanically fixed to the on-vehicle holder 1, in addition to which the on-vehicle holder 1 and the portable telephone 2 are electrically connected, whereby it becomes possible to make hands-free calls inside the car by means of the portable telephone 2, or calls using the external antenna, and the like.

If, on the other hand, the portable telephone 2 installed in the on-vehicle holder 1 is to be removed from the on-vehicle holder 1, then the operating buttons 51b of the tray locking mechanism 50 should be pressed down against the force of the small springs 52, and the tray locking members 51 caused to turn, in such a manner that the pawls 51b separate from the tray locking pawls 20r.

In this way, by releasing the engagement between the tray locking pawls 20r and the pawls 51p, the tray 20 is moved from the installation position to the halt/detachment position, by the force of the spring 40, as indicated by the arrow E in FIG. 2, FIG. 16 and FIG. 18.

In this case, since the spring 40 impels the tray 20 with a pressing force that reliably exceeds the interconnecting force between the holder-side connector 1C and the device-side connector 2C, the device-side connector 2C can be removed reliably from the holder-side connector 1C by movement of the tray 20.

Moreover, the tray 20 moving in the direction of the halt/detachment position from the installation position due to the pressing force of the spring 40 is stopped in the halt/detachment position, when the front step section 21s of the first side holding section 21 confronts the opening edge section 11s of the holder main unit 10.

In other words, the tray 20 holding the portable telephone 2 is caused to stop reliably at the halt/detachment position by means of the front step section 21s of the tray 20 confronting the opening edge section 11s of the holder main unit 10.

When the tray 20 has moved to the halt/detachment position, the device-side connector 2C on the portable telephone 2 held in the tray 20 will be separated completely from the holder-side connector of the holder main unit 10.

Moreover, in a state where the tray 20 is situated at the halt/detachment position, the stopper arm 31s of the device locking member 31 is separated from the stopper rib 12s, as illustrated in FIG. 6 and FIG. 15, and therefore the restriction of the device locking member 31 provided by the stopper rib 12s ceases to act.

Consequently, if an appropriate upward force is applied to the portable telephone 2 when it is held in the tray 20, then the device locking member 31 will turn and the pawl 31p will detach from the locking recess section 2R.

Therefore, once the top section of the portable telephone 2 has been lifted up from the second side holding section 22, in the direction indicated by the broken arrow Ye in FIG. 14, then by removing the installation grooves 2G, 2G from the guide ribs 21r, 21r of the first side holding section 21 and pulling the portable telephone 2 upwards in an oblique direction as indicated by the broken arrow Xe, it is possible to detach the portable telephone 2 from the tray 20.

In this way, by the simple operation of pushing down the operating button 31b in the tray locking mechanism 30, the mechanical fixing of the portable telephone 2 to the on-vehicle holder 1 is released, and the electrical connection between the on-vehicle holder 1 and the portable telephone 2 is also released.

As described above, in the on-vehicle holder 1 according to the present embodiment, a composition is adopted wherein the tray 20 moving from the installation position towards the halt/detachment position due to the impelling force of the spring 40 is stopped at the halt/detachment position by means of the opening edge section 11s forming tray stopper mechanism provided on the holder main unit 10, and consequently, the tray 20 can be stopped reliably in the halt/detachment position, regardless of the magnitude of the pressing force on the tray 20 caused by the impelling force of the spring 40.

In other words, the impelling force of the spring 40 pressing on the tray 20 can be set appropriately within a wide range of selection, provided that it satisfies the condition of exceeding the interconnecting force between the holder-side connector 1C and the device-side connector 2C, and therefore no complex operations relating to the setting of the spring 40 are required in designing the on-vehicle holder 1.

Furthermore, in the on-vehicle holder 1 according to the present embodiment, by situating the tray holding the portable telephone 2 at the installation position, mechanical fixing and electrical connection between the on-vehicle holder 1 and the portable telephone 2 is achieved, whereas by situating the tray 20 at the halt/detachment position, the mechanical fixing and electrical connection between the on-vehicle holder 1 and portable telephone 2 is released.

Moreover, in the on-vehicle holder 1 according to the present embodiment, since the tray 20 holding the portable telephone 2 is provided movably with respect to the holder main unit 10, in the direction in which the device-side connector 2C on the portable telephone 2 is attached or detached with respect to the holder-side connector 1C on the holder main unit 10, then the device-side connector 2C on the portable telephone 2 held in the tray 20 can be attached to and detached from the holder-side connector 1C in a very smooth manner, without applying unwanted stress to the holder-side connector 1C, by moving the tray 20 between the halt/detachment position and the installation position.

Consequently, according to the on-vehicle holder 1 of the present embodiment, smooth and reliable installation and detachment of the portable telephone 2 with respect to the on-vehicle holder 1 can be achieved, without requiring complicated setting tasks during design.

The embodiment described above related to an example where the present invention is applied to an on-vehicle holder for using a portable telephone inside a vehicle, but naturally, radio device holders relating to the present invention may be adopted effectively as means for holding various types of radio devices other than a portable telephone, in a desired location other than the interior of a vehicle.

What is claimed is:

1. A radio device holder comprising:

a holder main unit having a holder-side connector for interconnecting with a device-side connector provided on a radio device;

a tray having a holding section for holding the radio device in a prescribed attitude, the tray being provided movably with respect to the holder main unit, in a direction along which the device-side connector on the radio device is inserted into or removed from the holder-side connector, between an installation position at which the device-side connector is interconnected with the holder-side connector, and a halt/detachment position at which the device-side connector is separated from the holder-side connector;

device locking means having a device locking member provided movably on the holding member of the tray between an engagement/disengagement state with respect to a locking recess section provided in the radio device, for holding the radio device in the tray in such a manner that it is detachable therefrom by manual operation of an operator, when the tray is situated in the halt/detachment position;

lock stopper means provided on the holder main unit, for restricting the device locking member of the device locking means to an immovable state when the tray is situated at the installation position, and holding the radio device held in the tray in such a manner that it cannot be detached from the tray by the device locking means;

tray impelling means, interposed between the holder main unit and the tray, for impelling the tray constantly in a direction from the installation position towards the halt/detachment position, by means of a pressing force exceeding the interconnecting force between the holder-side connector and the device-side connector;

tray locking means which comprises a tray locking member provided on the holder main unit to operate in a state engaged with or detached from the tray, and which fixes the tray in the installation position by engaging same with the tray situated at the installation position, and releases the engagement between the tray locking member and the tray by operation of an operating button provided on the tray locking member; and tray stopper means provided on the holder main unit, so that the tray stopper means is abutted against the tray moving from the installation position to the halt/detachment position by the pressing force of the tray impelling means, for causing the tray to stop at the halt/detachment position.

2. The radio device holder according to claim 1, wherein the radio device is provided with the device-side connector on a base section thereof, installation grooves on base sides of left and right-hand sides thereof, and a locking recess section on a top section thereof.

3. The radio device holder according to claim 2, wherein the tray comprises a first side holding section for holding the base section of the radio device, and a second side holding section for holding the top section of the radio device.

4. The radio device holder according to claim 3, wherein the tray comprises, in the first side holding section, a cradle which conforming to a shape of the base section of the radio device and a pair of guide ribs which engage with the installation grooves of the radio device.

5. The radio device holder according to claim 3, wherein the tray comprises, in the second side holding section, a cradle conforming to a shape of the top section of the radio device and the device locking means for engaging/disengaging with respect to the locking recess section in the radio device.

6. The radio device holder according to claim 1, wherein the holder main unit has a pocket section for accommodating an end portion of the radio device, at one end section thereof, and a pair of guard sections which face with the left and right-hand sides of the radio device, at the other end section thereof.

7. The radio device holder according to claim 1, wherein the holder main unit has a recess section for preventing interference with a belt clip fixture metal on the radio device.

8. The radio device holder according to claim 1, wherein the tray locking means is provided on the left and right-hand side regions of the tray.

9. The radio device holder according to claim 1, wherein the radio device is a portable telephone.

10. The radio device holder according to claim 1, being an on-vehicle holder for using a portable telephone inside a vehicle.

* * * * *